No. 627,144. Patented June 20, 1899.
G. A. SCHEEFFER.
ELECTRIC TRANSFORMER.
(Application filed Jan. 11, 1899.)
(No Model.)
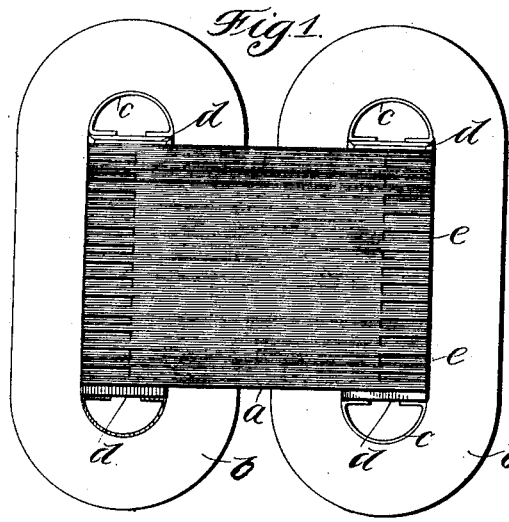
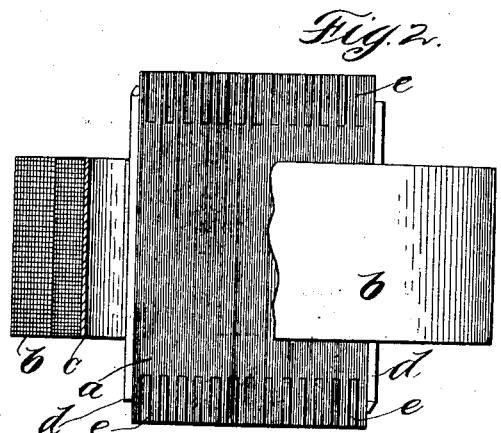
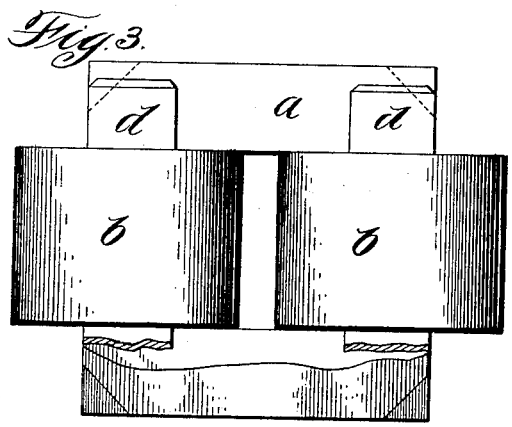
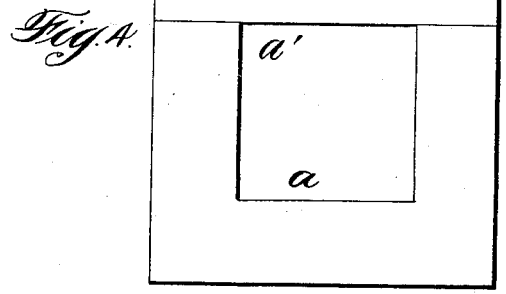
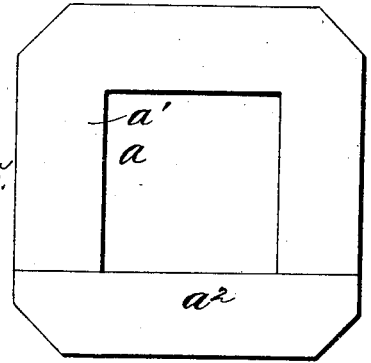
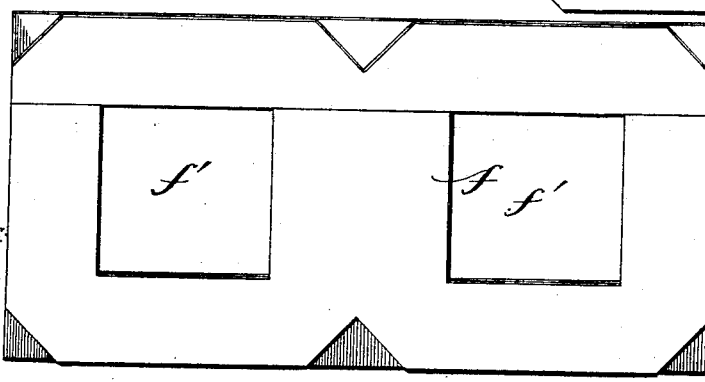

UNITED STATES PATENT OFFICE.

GUSTAVE A. SCHEEFFER, OF PEORIA, ILLINOIS, ASSIGNOR TO THE DIAMOND METER COMPANY, OF SAME PLACE.

ELECTRIC TRANSFORMER.

SPECIFICATION forming part of Letters Patent No. 627,144, dated June 20, 1899.

Application filed January 11, 1899. Serial No. 701,816. (No model.)

*To all whom it may concern:*

Be it known that I, GUSTAVE A. SCHEEFFER, a citizen of the United States, residing at Peoria, in the county of Peoria and State of Illinois, have invented a certain new and useful Improvement in Transformers, (Case No. 11,) of which the following is a full, clear, concise, and exact description.

My invention relates to electrical converters or transformers for alternating, intermittent, or pulsating currents.

A well-known system of distribution of electrical energy is one that consists in supplying alternating currents of electricity from a distant point of generation over conductors of small cross-section, the current being transmitted at great pressure and small volume. From these conductors or mains the current is taken off at various points of consumption through the medium of electrical converters or transformers. The most efficient transformer comprises a core composed of laminæ arranged parallel to the magnetic lines of force within the field to prevent the production of Foucault currents, the core being of such a class as to form a closed magnetic circuit, about which are disposed a primary coil of fine wire connected in parallel with the main conductors and a secondary coil of coarser wire usually in parallel circuit with the translating devices at the point of distribution. This particular type of transformer is used where a current of high pressure and low volume is to be transformed into current of larger volume and less pressure. In some instances, however, transformers are used to increase the pressure and diminish the volume as compared with the pressure and volume of the feeding-conductors, in which case the primary coil is composed of wire thicker than that of the secondary coil. The alternating magnetization and demagnetization of the magnetic core by the primary winding or the reversal of its magnetic polarity tends to produce a corresponding electromotive force in the neighboring or secondary conductors.

It has been found in practice that the lamination of the magnetic core alone is not sufficient to prevent the heating of the transformer to an undesirable degree. It has therefore been proposed heretofore to provide ventilating recesses or grooves in the core, the walls of the recesses, grooves, or slots serving to radiate and dissipate the heat generated in the core. These results heretofore have been accomplished, however, at the expense of space larger than that required for the electrical operation of the transformer, the transformer having to be made larger on account of the manner in which the recesses or slots have been placed. The most approved type of ventilated cores heretofore used is one in which the cores have rectangular contours, the grooves or slots being provided in the sides of the cores. It is obvious with this form of transformer-core that in order to secure the required magnetic density it is necessary to increase the size of the core. Heretofore it has also been the practice to interpose solid wedges between cores and the transformer-coils, this construction preventing the ventilation of the spaces thus occupied by the solid wedges.

My invention herein has for its object the improvement of the construction of transformers wherein ventilating slots or recesses are provided in such a way as to avoid the necessity of enlarging the size of the transformer-cores above the size heretofore employed in transformers whose cores were provided with no ventilating-recesses.

My invention has for its object, further, the provision of an improved form of wedges or distance-pieces interposed between the transformer coils and cores which will permit of the thorough ventilation of the spaces in which the wedges or plugs are placed.

Two kinds of transformers are well known, one the core-transformer, in which the primary and secondary wires are wrapped around the outside of the core, and the other the shell-transformer, in which the primary and secondary coils are laid on each other, the iron core being placed through and over them, so as to inclose all the wire of the primary and secondary coils. The cores usually employed in shell and core transformers are rectangular, the cores being made up of rectangular laminæ. The corner portions of the cores are of larger cross-section diagonally than the sides of the cores, so that the corner portions of the cores present a greater cross-section than is absolutely necessary for the passage of the lines of magnetic force, or, in other words, these portions of the core are of decreased magnetic resistance compared with the remaining portions of the core. I have taken advantage of this fact in the device of my invention, which may be generally described as consisting in a transformer provided with a core having an angular corner or corners, the corner portion or portions of the core being provided with grooves, which preferably are deep enough to present a cross-section to the lines of force corresponding to the required magnetic density, the walls of the recesses serving to radiate the heat arising in the core. In the preferred embodiment of my invention cores composed of rectangular laminæ are provided, a number of the laminæ, preferably about one-half of the total number, being cut off at the corners to such an extent as not to increase the magnetic resistance, these trimmed laminæ being distributed in groups at intervals among the rectangular laminæ, the core as thus formed serving thoroughly to radiate the heat without unnecessarily increasing the space occupied by the core, this construction at the same time being very simple and cheap. In assembling the coils upon the cores I provide hollow wedges or distance-pieces or wedges of such construction as will not totally fill the spaces between the coils and cores, whereby these spaces may be ventilated.

I will explain my invention more particularly by reference to the accompanying drawings, in which—

Figure 1 is a plan view of a transformer constructed in accordance with my invention. Fig. 2 is a side elevation thereof, partially in section. Fig. 3 is an end elevation with portions broken away to reveal more clearly the construction. Fig. 4 is an elevation of an untrimmed core-plate or lamina. Fig. 5 is an elevation of a core-plate or lamina whose corners have been trimmed. Fig. 6 is a top perspective view of two core-plates or laminæ used in constructing shell-transformers in accordance with my invention.

Like letters indicate like parts throughout the different views.

In Figs. 1, 2, 3, 4, and 5 I have shown a transformer, the laminæ being in the form of hollow rectangular plates $a$, each plate being composed of a U-shaped portion $a'$ and a strip $a^2$. These laminæ are assembled as shown, a primary and a secondary coil being placed about opposite sides of the hollow rectangular core, the transformer-coils $b\ b$ being preferably placed about the legs of the U-shaped parts of the laminæ. Distance-pieces or wedges $c$ are interposed between the rounded ends of the coils and the core, as shown most clearly in Figs. 1 and 2, these distance-pieces not conforming in cross-section to the spaces between the coils and core, whereby these spaces are ventilated. I preferably construct each of these distance-pieces in the form of a semicylindrical tube of iron, the central portion of the diametrical wall of each distance-piece being removed, so that the distance-pieces may accommodate themselves to slight irregularities in the size of the spaces between the coils and core. I also preferably interpose a thin wedge $d$ of iron between the distance-pieces and core, these latter wedges serving to retain the U-shaped and strip portions of the laminæ in place. A number of the laminæ are trimmed, preferably at each corner, as shown in Fig. 5, the cross-section of the trimmed laminæ at the corner portions being, however, preferably not reduced below the cross-section at the sides. These trimmed laminæ are assembled in groups and disposed between groups of the remaining laminæ, whose contour may be that shown in Fig. 4, whereby recesses $e$ are provided at the outer corners of the core parallel with or extending longitudinally of the bore or hollow of the core, the walls of these grooves serving to dissipate the heat of the core, the electrical efficiency of the core being unimpaired by the recesses.

For the sake of economy in manufacture I cut the corners of the trimmed laminæ to have the corners present a plane surface disposed at an angle to the contiguous sides instead of a curved surface, by which latter construction a slightly-deeper groove might be secured without impairing the efficiency of the core, but which, however, would not materially increase the efficiency of the ventilating-slots.

In Fig. 6 I have shown two plates of a core of a shell-transformer such as may be employed in accordance with my invention. The outer corner portions of some of the plates may be trimmed, as also the intermediate portions of the longer sides of the plates, these portions being at the outer edges. Other of the plates may be untrimmed and the plates may be assembled in groups to provide the necessary ventilating-recesses. Each of the core-plates shown in Fig. 6 is in the form of a rectangle provided with a central rib $f$, about which the transformer-coils may be placed, this rib separating two parallel recesses $f'\ f'$.

While I have herein shown and particularly described one arrangement and construction of the laminæ, it is obvious that other arrangements and constructions may be employed without departing from the spirit of my invention, and I do not therefore desire to be limited to the precise details of construction shown; but, Having described my invention, I claim as new and desire to secure by Letters Patent—

1. As a new article of manufacture, a magnetic core having sides angularly placed with relation to each other, the said sides uniting to form an angular corner, recesses being provided in the said corner angularly disposed with relation to the said sides, whereby ventilation may be secured without impairing the magnetic density, substantially as described.

2. As a new article of manufacture, a hollow rectangular magnetic core having its corners slotted, substantially as described.

3. As a new article of manufacture, a hollow rectangular magnetic core having a corner or corners extending longitudinally of the bore of the transformer recessed, substantially as described.

4. As a new article of manufacture, a rectangular magnetic core composed of laminæ, some of the laminæ having their corners cut away and distributed throughout the core to form ventilating-recesses at the corners of the core, substantially as described.

5. In a transformer, the combination with a rectangular magnetic core composed of laminæ having some of their corners cut away to provide ventilating-recesses in the core, of transformer-coils disposed in inductive relation with the said core, substantially as described.

6. In a transformer, the combination with a hollow rectangular magnetic core composed of laminæ, some of whose outer corners are cut away to form ventilating-recesses in the core, the remainder of the corners of the laminæ remaining intact, the trimmed corners and intact corners being arranged in groups to form ventilating-recesses in the core, of coils disposed in inductive relation with said core, substantially as described.

7. As a new article of manufacture, a magnetic core composed of laminæ having central ribs $f$ separating openings $f'\ f'$, some of the laminæ being cut away between the openings $f'\ f'$ opposite the ribs $f$ and at the outer edges of the latter laminæ, the recessed or cut-away portions of the laminæ being placed adjacent to the unrecessed laminæ to form ventilating-recesses, substantially as described.

8. In a transformer, the combination with a magnetic core, of a coil having rounded ends and hollow semicylindrical distance-pieces interposed between the coil and core, each of said distance-pieces having a diametrical wall partly cut away, substantially as described.

9. The combination with a magnetic core, of a coil having a rounded end and a hollow semicylindrical distance-piece interposed between the rounded end of the coil and the core, said distance-piece being provided with a diametrical wall partially cut away, whereby the distance-piece may accommodate itself to variations in the space between the core and coil, substantially as described.

10. The combination with a magnetic core, of a coil having a rounded end, and a hollow semicylindrical distance-piece interposed between the core and coil, substantially as described.

11. The combination with a core, of a coil surrounding the same, and a distance-piece interposed between the core and coil, said distance-piece not filling the entire space between the core and coil, whereby the said space may be ventilated, said distance-piece being adapted to accommodate itself to variations in the space between the core and coil, substantially as described.

12. The combination with a core, of a coil surrounding the same, and a distance-piece or wedge interposed between the coil and core and shaped so as to occupy but a portion of the space intervening between the core and coil, whereby the said space may be ventilated, substantially as described.

In witness whereof I hereunto subscribe my name this 30th day of December, A. D. 1898.

GUSTAVE A. SCHEEFFER.

Witnesses:
C. JOHNSON,
A. KEITHLEY.